United States Patent
Hu et al.

(10) Patent No.: US 8,154,260 B2
(45) Date of Patent: Apr. 10, 2012

(54) GENERATING SYSTEM

(75) Inventors: Lihua Hu, Rugby (GB); David R Trainer, Derby (GB); Stephen A Long, Carmel, IN (US)

(73) Assignee: Rolls-Royce PLC, London (GB)

( * ) Notice: Subject to any disclaimer, the term of this patent is extended or adjusted under 35 U.S.C. 154(b) by 268 days.

(21) Appl. No.: 12/382,392

(22) Filed: Mar. 16, 2009

(65) Prior Publication Data
US 2010/0033141 A1    Feb. 11, 2010

(30) Foreign Application Priority Data

Apr. 10, 2008    (GB) .................................. 0806492.5

(51) Int. Cl.
*F02B 63/04*    (2006.01)
(52) U.S. Cl. .......................................... 322/37; 322/39
(58) Field of Classification Search ............. 322/37
See application file for complete search history.

(56) References Cited

U.S. PATENT DOCUMENTS

| | | | |
|---|---|---|---|
| 4,262,209 A | 4/1981 | Berner | |
| 4,661,760 A | 4/1987 | Goto et al. | |
| 4,829,228 A | 5/1989 | Buetemeister | |
| 5,594,322 A * | 1/1997 | Rozman et al. | 322/10 |
| 6,281,664 B1 * | 8/2001 | Nakamura et al. | 322/22 |
| 6,943,531 B2 * | 9/2005 | Fukaya | 322/10 |
| 7,309,974 B2 * | 12/2007 | Sarlioglu et al. | 322/47 |

* cited by examiner

*Primary Examiner* — Tulsidas C Patel
*Assistant Examiner* — Iraj A Mohandesi
(74) *Attorney, Agent, or Firm* — Oliff & Berridge, PLC

(57) ABSTRACT

Within generator systems maintenance of stability in terms of voltage is desirable. Generally, several generators will be arranged in parallel within the generator system with one generator voltage controlled to provide dynamic responsiveness to load switching. With regard to some loads which are generally of an active nature, the capacity of a first generator, which is voltage controlled, may be insufficient to adequately avoid transient voltage instability. By providing an actuator signal from a load to act as a pre-emptive or forward feed to an electrical current controlled generator, that second electrical current generator can be arranged to provide additional or reduced electrical current to avoid system voltage instability.

21 Claims, 5 Drawing Sheets

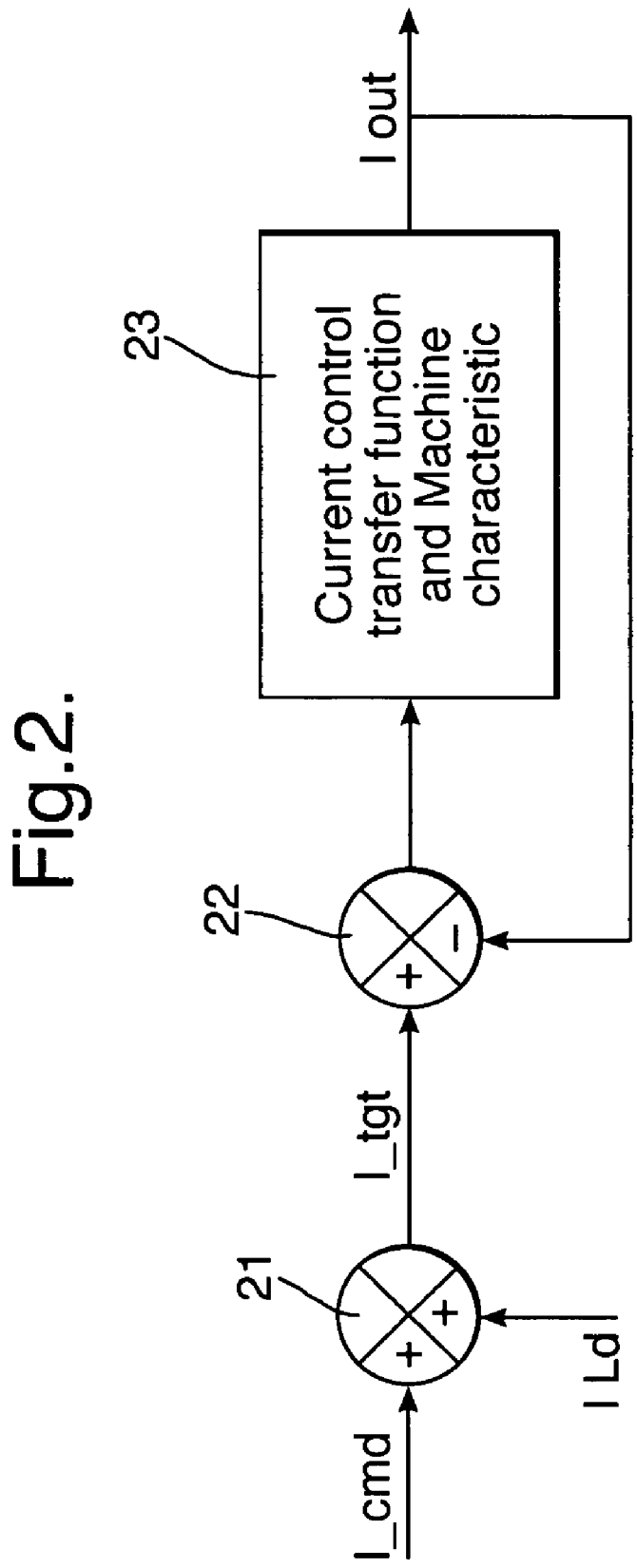

GENERATING SYSTEM

BACKGROUND

The present invention relates to generating systems and more particularly to generating systems comprising a number of electrical generators with one generator provided with voltage regulation and another generator provided with electrical current controllers.

Generating systems are known which comprise a number of generators arranged to contribute to a common distribution arrangement. For example, generators can be embedded within modern aero-engines in order to generate electricity for local engine control loads and also to meet electrical demand on an aircraft associated with the engine. In such circumstances there is parallel coupling in operation of the respective generators. Such parallel operation can bring benefits with regard to system efficiency, weight and availability of electrical power. In order to achieve parallel operation of such generators a suitable control methodology is required. This methodology will avoid conflicts between the respective generation capacities and inputs from the generators. Normally, one of the generators operates with a voltage control with the others operating with electrical current control. A typical prior system is illustrated in the attached drawing marked Prior Art.

Referring to the illustration marked Prior Art, it will be noted that steady operation is illustrated by point 1 where there is a stable voltage Vcmd and a stable electrical current Icmd. In order to provide such stability as indicated above, one electrical generator is designated to be under the dynamics of voltage control. In such circumstances a comparator 2 compares the desired voltage of Vcmd with the output voltage Vout from the voltage controller and generator 3. If the voltage output Vout does not equal Vcmd then through appropriate configuration of the associated generator dynamic adjustment is made until there is parity. Other generators provide an electrical current Icmd which again is compared with the output current Iout in a comparator 4. Any disparity is adjusted through reconfiguration using an electrical current controller and an electrical power generator 5 in order to achieve parity between Icmd and Iout. In such circumstances the steady state point 1 depicted graphically should be maintained. It will be understood that different electrical current controlled generators may have different values of Icmd.

Voltage control and electrical current control are normally independent controls. Both controls may be implemented on the same generator but they will not be active at the same time. A generator operating under voltage control is responsible for controlling electrical system dynamics whereas a generator operating under electrical current control does not provide any dynamic support to the generator that is controlling the generator system voltage.

It will be appreciated that an electrical generator or generators under electrical current control will at least attempt to maintain its electrical current output at the demand level at all times. The electrical current demand is normally provided from a higher level of system control which monitors, or predicts the total load level in the system and then decides the current demand for each generator under current control. Based upon this principle, the electrical current demand is relatively slow changing and hence, the electrical current control has a relatively slow response time. In such circumstances it is not possible for full system dynamics to be fulfilled with traditional electrical current control regimes. Electrical generators under electrical current demand controls will not respond to any system dynamics. Nevertheless, with regard to some electrical distribution systems relatively heavy electrical loads will result in highly dynamic scenarios with regard to the electrical power generation system. For example within an aeroplane there may be regenerative electrical surface actuators. When a surface actuator is activated it will draw a dynamically changing electrical current. As the load is stopped, the energy stored in the mechanical system will be released back into the power system as regenerated energy. Due to this variability it is difficult for a controller to predict electrical load and electrical demand and therefore dynamic loads such as actuators will always pose generator system instabilities.

As indicated above generally voltage controlled generators will normally operate within stability margins up to a limit of load changes that can be managed before unacceptable voltage dynamics occur. When a heavy actuator load is switched into a power generation system or particularly a power distribution arrangement, the dynamics imposed can be too fast and too severe for the voltage controlled generator to maintain the system voltage within acceptable levels. In such circumstances unacceptable system operation is provided.

SUMMARY

In accordance with aspects of the present invention there is provided a method of operating an electrical power system comprising a first electrical generator, a voltage controller, a second electrical generator, a current controller and a common electrical distribution arrangement, the first electrical generator and the second electrical generator being coupled to the common electrical distribution arrangement, the method comprising regulating electrical voltage upon the common electrical distribution arrangement using the first electrical generator and the voltage controller, providing electrical current using the second electrical generator and the current controller, providing and actuator signal to the current controller to alter the electrical current provided by the second generator, the actuator signal providing an indication of status of an electrical load upon the common electrical distribution arrangement.

Also in accordance with aspects of the present invention there is provided an electrical power system comprising a first electrical generator, a voltage controller, a second electrical generator, a current controller and a common electrical distribution arrangement, the first electrical generator and the second electrical generator being coupled to the common electrical distribution arrangement, the first electrical generator being controlled by the voltage controller and being arranged to configure the first electrical generator to regulate voltage upon the common electrical distribution arrangement, the second electrical generator being controlled by the current controller and being arranged to provide electrical current to the common electrical distribution arrangement, the system having an electrical load coupled to the common electrical distribution arrangement, a control element arranged to provide an actuator signal to the current controller upon change in the status of the electrical load and the current controller being arrangement to alter the electrical current provided by the second electrical generator dependent upon the actuator signal.

Typically, there is more than one second electrical generator.

Generally, the actuator signal comprises a composite signal from a plurality of electrical loads.

Typically, the actuator signal is provided by hard wiring or network communication with the current controller.

The electrical load provides or receives electrical current from the common electrical distribution arrangement. Possibly, the electrical load includes a resistive component and/or a reactive component. Possibly, the electrical load is variable.

The electrical power system may be incorporated in a gas turbine engine and/or via an aircraft.

BRIEF DESCRIPTION OF THE DRAWINGS

Aspects of the present invention will now be described by way of example and with reference to the accompanying drawings in which:

FIG. 2 is a schematic illustration of electrical current control in accordance with aspects of the present invention;

DETAILED DESCRIPTION OF EMBODIMENTS

Figure 1:
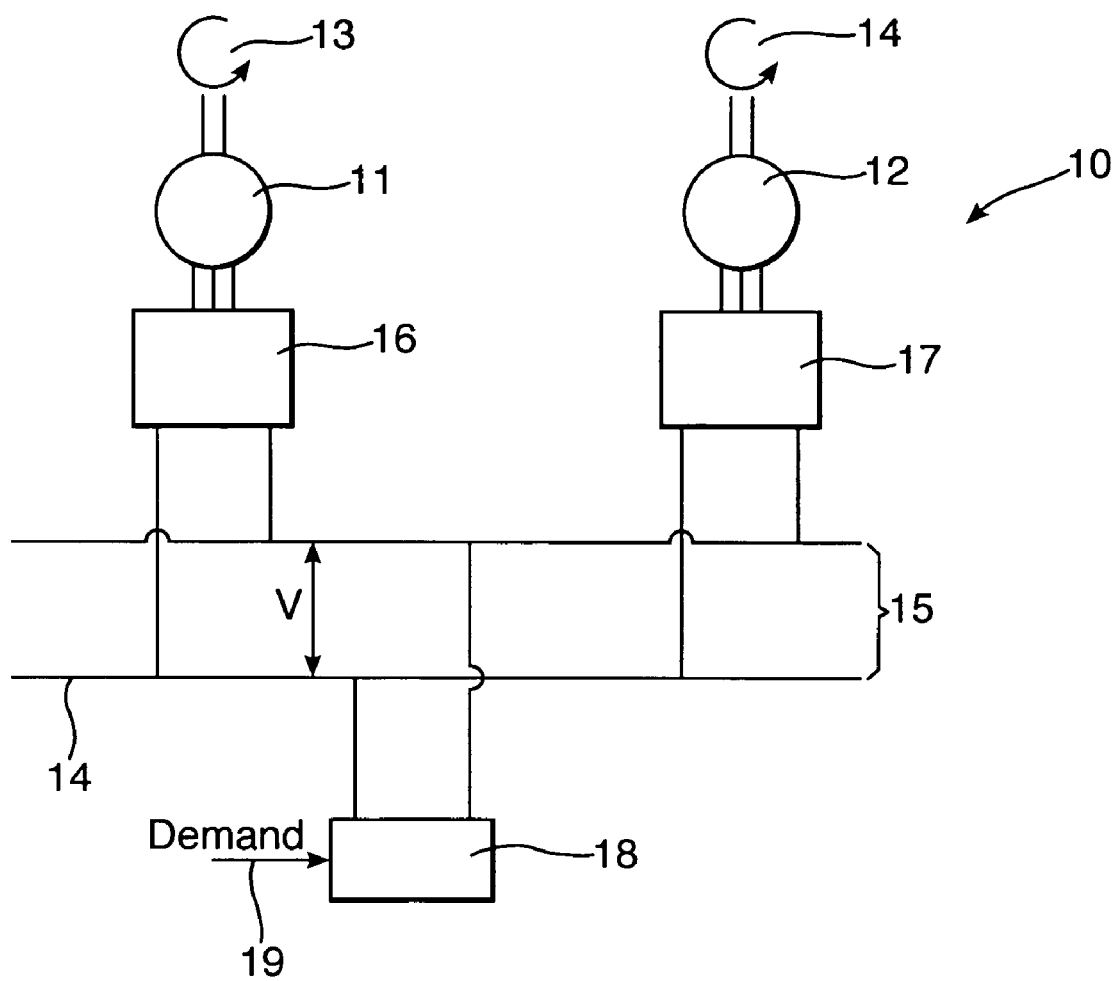
FIG. 1 is a schematic illustration of a generator system in accordance with aspects of the present invention.
Figure 1A:
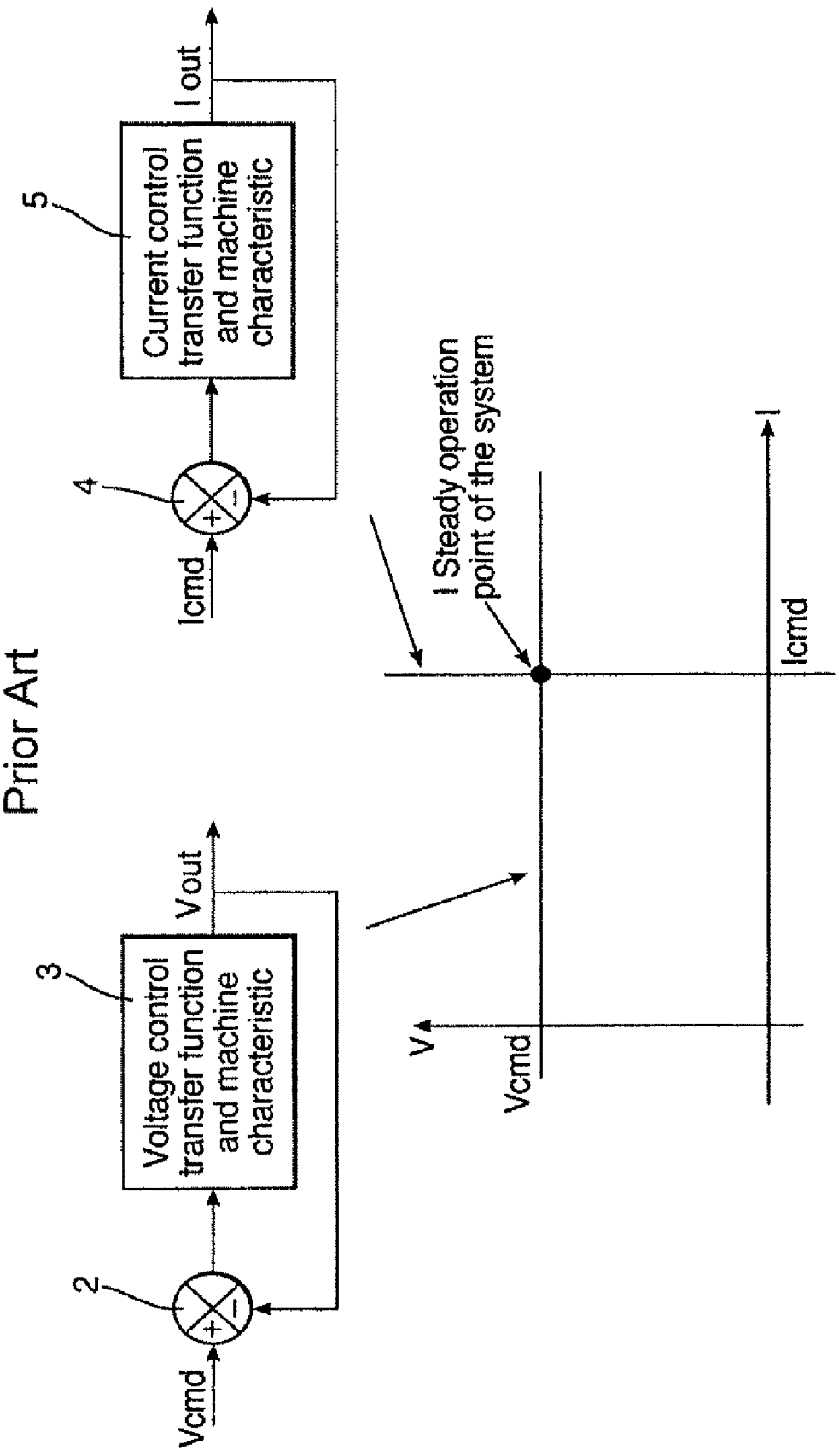
FIG. 1A illustrates a typical generating system.

FIG. 1 provides a schematic illustration of a typical electrical power network 10 in accordance with aspects of the present invention. The system 10 comprises a first generator 11 and a second generator 12 coupled in parallel. Respective generators 11, 12 are driven by suitable primary movers such as gas turbine engines 13, 14. The generators 11, 12 are associated with a common distribution arrangement 15. A voltage controlled first generator 11 is associated through a voltage controller 16 which can determine the desired voltage within the arrangement 15. In such circumstances through the controller 16 the generator 11 can be configured in order to provide dynamic adjustment and control to maintain and achieve a desired voltage. In such circumstances, the controller 16 generally incorporates a voltage sensor across the arrangement 15 in order to determine the value of the operational voltage and compare that value with the desired operational voltage value for the arrangement 15.

The electrical current controlled generator 12 is associated with the arrangement 15 through an electrical current controller 17. In such circumstances the controller 17 will be arranged to configure the generator 12 for generating its proportion of the electrical current to the arrangement 15.

The electrical distribution arrangement 15 is associated with a load 18. The load 18 may be an actuator or a control load for one of the generators 11, 12 or one of the prime mover engines 13, 14. If the load 18 is significant or the number of loads 18 switched is significant on the arrangement 15 then there will be a dip or raise in the operational voltage. If these changes are within the capabilities of the generator 11 and associated controller 16 then the generator 11 will be used so that the operational voltage is dynamically adjusted for maintenance of the voltage within acceptable margins for operation of the arrangement. If the load 18 or a combination of loads 18 is greater than the capabilities of the generator 11 and the controller 16, then instability will be created.

In accordance with aspects of the present invention a demand signal or actuator signal 19 for the load 18 is also coupled to the electrical current controller 17. In such circumstances, the controller 17 will effectively have instantaneous or possibly in view of lag within the arrangement 15 slightly prior notice with regard to electrical current demand. The controller 17 can then appropriately configure a generator 12 in order to provide electrical current for the expected load 18. With the electrical current adjusted by the controller 17 in view of the provision of the actuator signal associated with load 18 it will be understood that de-stabilising transients as a result of switching of the load 18, which may not be within the capability of the generator 11 alone, can be more easily accommodated. The electrical load 18 and/or its demand signal 19 provides an indication of the status of the electrical load to the arrangement.

FIG. 2 provides a schematic illustration of an electrical current control arrangement in accordance with aspects of the present invention. As illustrated a steady state electrical current command Icmd is provided to a control element or summation block 21. The summation block 21 also receives electrical current demand in the form as indicated above of an actuator signal ILd. In the steady state conditions the value of ILd may be zero or relatively low. In such circumstances the summation block 21 will identify such a zero or low load demand and provide no action. With a low or zero electrical current demand it will be understood that the voltage controlled generator and voltage controller will be adequate to accommodate for dynamic instabilities and therefore adequate to maintain the desired voltage level in the arrangement 15. If the actuator signal in the form of an electrical current demand ILd is greater than a threshold defining the margin capability of the voltage controlled generator then the summation block 21 will identify a necessary electrical current target value, Itgt, to be presented to a comparator 22. This comparator 22 in a similar fashion to that described above with regard to comparator 4 in the Prior Art illustration will compare the electrical current output Iout from the generator 23 under appropriate electrical current control with the necessary electrical current demand, the current target value Itgt, for stability.

In the above circumstances, in normal steady state conditions, that is to say when the load demand ILd is below the threshold, then Itgt=Icmd and the arrangement will operate in a conventional fashion as described above with regard to the Prior Art figure. However, when a relatively high load or a load above the threshold is demanded, this will be presented to the summation block 21 which will then deduce the necessary electrical current target value Itgt which will then be used by the comparator 22 in order to appropriately configure the generator and controller 23 such that the electrical current Iout=Itgt to accommodate the extra or changed electrical load demand and therefore stabilise operating conditions. In such circumstances it will be understood that the generator or generators operating with electrical current control will supplement the dynamic control provided by the existing voltage controlled generator and voltage controller in order to maintain electrical voltage within a common distribution arrangement.

It will be understood that it is important the electrical load status is transferred rapidly to the electrical current control for the generators in accordance with aspects of the present invention. In such circumstances with regard to a gas turbine engine and generators utilised in an aircraft, it will be understood that the airframe is relatively small and therefore all power generators and electrical loads are likely to be located close to each other. Such an approach allows information upon the load status presented through the actuator signals to be monitored locally and almost instantaneous load demand signals again through the actuator signals provided to the electrical current controls for the respective generators. The actuator signals may be transmitted through hardwiring or through control network communications to the respective electrical current controls or controllers.

With near instantaneous load demand provided through the actuator signals available to each electrical current controller for each generator, it will be understood that the electrical current demand can then be utilised in order to vary as indicated above the actual electrical current output to generate the necessary dynamic electrical current requirement for the present load demand. This approach is consistent with aspects of the present invention in allowing forward feeding of electrical load current demands, allowing more dynamic control extending the acceptable control, and in particular voltage, margins for the distribution arrangement.

In accordance with aspects of the present invention, greater dynamic control is provided in that the voltage controlled generator, although generally designed and designated for expected operational transients, may struggle with certain load conditions. By utilisation of aspects of the present invention when relatively large loads or load swings are expected, the actual current control generator can also be utilised dynamically to supplement the effectiveness of the voltage controlled generator and therefore provide greater stability with regard to operation of the generator system, or at least dampen such instability.

Figure 3:
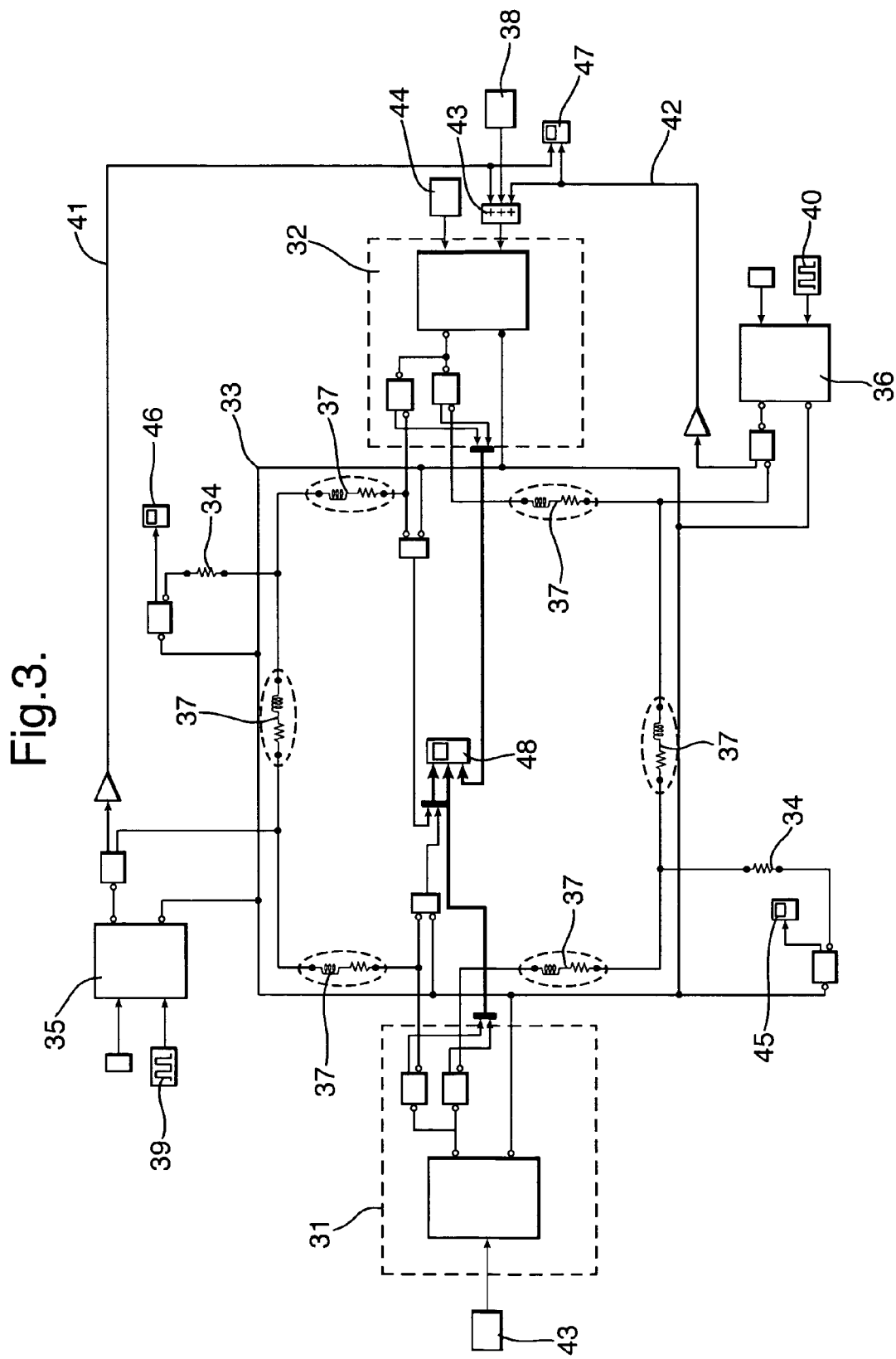
FIG. 3 is a generator system illustration in accordance with aspects of the present invention; and, FIG. 4 provides graphic comparisons between electrical current load with regard to a prior generator system and a generator system in accordance with aspects of the present invention.

FIG. 3 provides a generator system model in accordance with aspects of the present invention. The system model depicted in FIG. 3 provides two electrical power generators operating in parallel on a ring structured common distribution arrangement. It will be appreciated that in more practical systems more generators may be utilised.

A first generator designated by broken line 31 is voltage controlled. A second generator designated by broken line 32 is controlled by electrical current. In such circumstances the first generator 31 maintains a desired electrical voltage value in a common distribution arrangement 33 whilst the second generator 32 supplies electrical current typically along with other second generators not shown.

In accordance with the embodiment of aspects of the present invention depicted in FIG. 3, electrical resistance loads 34 are provided along with active or variable loads 35, 36. Thus, there are resistive loads and active loads which can be switched into and out of the distribution arrangement 33. It will be understood that the arrangement 33, itself incorporates a system load as a result of its structure. This system contains connection cables characterised by resistive and inductive elements, 37.

Generally, the voltage controlled generator 31 will be adequate in order to substantially maintain a desired operational voltage for the distribution arrangement 33 with respect to the resistive loads 34. However, with respect to the active loads 35, 36 in accordance with the generator system depicted in FIG. 3, dynamic electrical current control is provided to the generator 32.

In normal steady state operation the electrical current control generator 32 is configured to provide an electrical current load 38. In such circumstances within the electrical current control the generator will be configured to maintain that electrical current Icmd as described above and defined by input 38 in FIG. 3. In accordance with aspects of the present invention, when the loads 35, 36 are activated through a respective control pulse 39, 40, the loads 35, 36 are arranged to provide a respective actuator signal 41, 42 to the electrical current controller and in particular a module 43, in order to adjust the electrical current output from the generator 32 to effectively meet the electrical current demands of the loads 35, 36. The module 43, as described above is a summation block like 21 which will determine the electrical current requirement and therefore configure the generator 32 in order to provide electrical current at the required level for the loads 35, 36 to the arrangement 33.

In the above circumstances as indicated with regard to the voltage controlled generator 31, the voltage control will reconfigure the generator 31 in terms of speed 43 and other parameters within the generator 31 in order to provide the voltage dynamic adjustment for maintenance of a desired electrical voltage in the arrangement 33. With regard to the electrical current controlled generator 32, again reconfiguration to meet the necessary electrical current for dynamic response to switching of the loads 35, 36 may be through adjustment of a speed 44 or other configuration of the generator 32.

It will be noted in FIG. 3 numerous oscilloscopes 45, 46, 47, 48 are provided in order to identify voltage and electrical current levels within the system depicted in FIG. 3.

Figure 4:
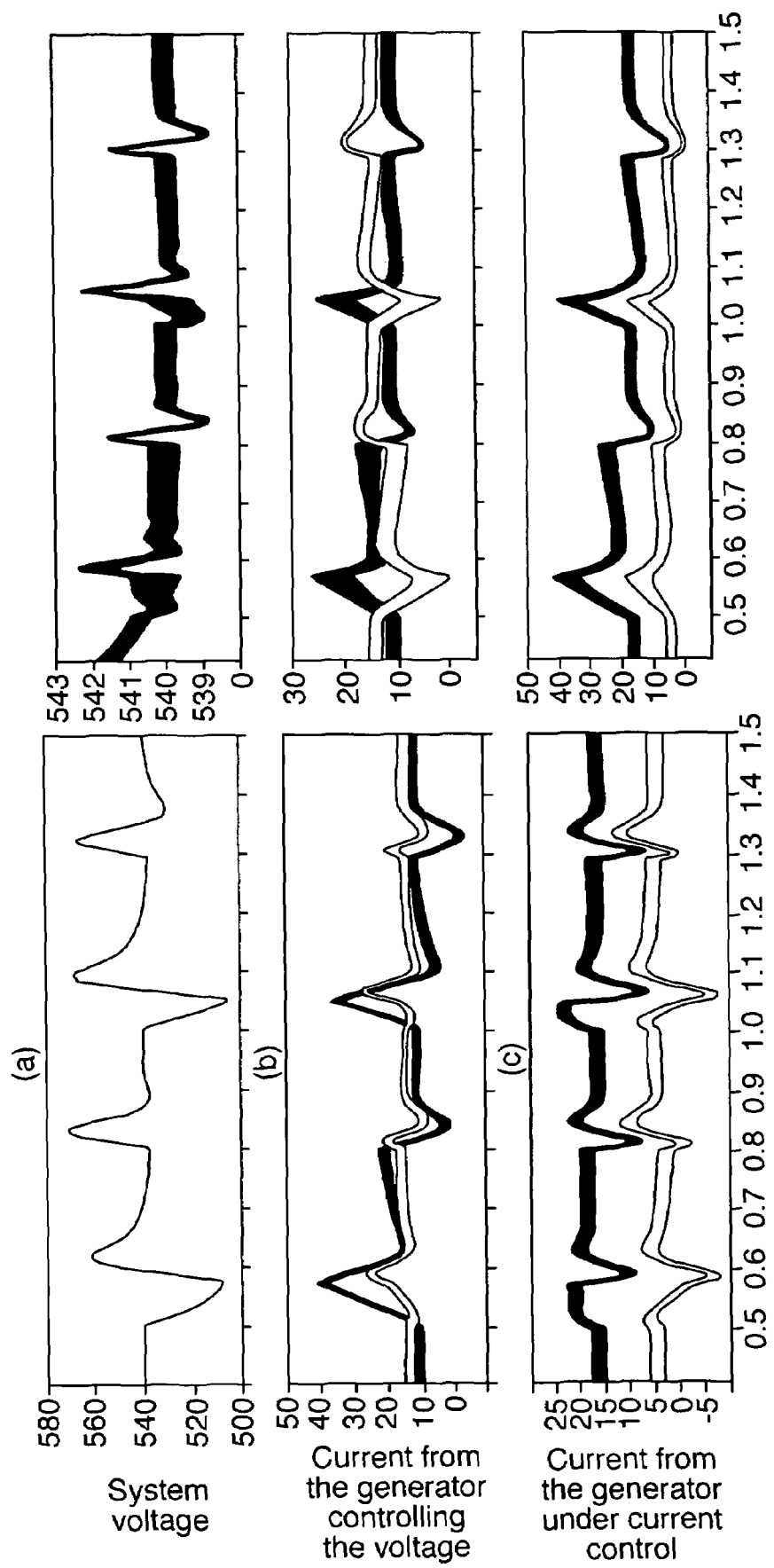

FIG. 4 provides a comparison between the same operating conditions both with and without electrical current dynamic or forward feed control in accordance with aspects of the present invention. It will be observed from the simulated results that when dynamic electrical current control, in accordance with aspects of the present invention, is not used, the dynamic current load will be supplied by the voltage control generator. Owing to delayed response of the load demand upon the voltage control generator, the system voltage will vary over an unacceptable range. When an almost instantaneous dynamic electrical current control is utilised, then the dynamic electrical current load is generally supplied largely by the generator under electrical current control and this relieves the burden from the voltage control generator resulting in a greater maintenance of a constant generator system voltage.

In FIG. 4 the left hand oscilloscope traces illustrate respectively at (a) distribution arrangement system voltage, (b) current from the voltage control generator and (c) current from the electrical current controlled generator. Without dynamic electrical current control in accordance with aspects of the present invention and with such dynamic control with regard to the corresponding right hand oscilloscope traces. As can be seen during a load switching action greater stability is provided particularly with regard to system voltage (FIG. 4a) with forward dynamic electrical current load control in response to actuator signals from the load to the electrical current control in accordance with aspects of the present invention.

With aspects of the present invention, a generator system is provided in which dynamic electrical current generation is achieved to support dynamic loads applied upon a distribution arrangement. In such circumstances such switched dynamic loads have less effect upon and result in less instability with regard to system voltages within the distribution arrangement. In such circumstances there is a reduction in system dynamics and system instability with an overall operational performance improvement with respect to the generator system.

Aspects of the present invention operate a generator system by providing a link between the load or its demand and the electrical current controller for the electrical generator. It is this process of utilising the actuator signal for the dynamic load in terms of pre-empting or forward feeding to enhance electrical current output from the second generator which augments the effectiveness of voltage control of the principal stability providing first generator in accordance with aspects of the present invention. Forward feed improves the effectiveness of generally slower electrical current control of generators.

Generally, as indicated above, electrical power systems will incorporate a number of generators. The voltage controlled generator as indicated will be designed to provide sufficient margin for stability with respect to certain and in particular resistive loads. However, with large active loads, as indicated above, and in particular where those loads are of a regenerative nature utilisation of pre-emptive or forward feeding dynamic electrical current control to adjust the electrical current provided by the second generators utilising electrical current control will be advantageous is maintaining stability.

It will be understood that the electrical current generators may increase or decrease the electrical current contribution by the respective second electrical generator dependent upon the load demand presented to the common distribution arrangement. With a regenerative load, it will be understood that the load may draw electrical current or inject electrical current dependent upon the phase of operation of the load.

Modifications and alterations to aspects of the present invention will be appreciated by those skilled in the art. Thus, the actuator signal may be presented to all electrical current controllers for all second generators in accordance with aspects of the present invention or to particular notable current generators and their associated electrical current controls hardwired or otherwise in communication with respective loads in order to be particularly responsive to those loads and requirements.

We claim:

1. A method of operating an electrical power system, the electrical system comprising a first electrical generator, a voltage controller, a second electrical generator, a current controller, and a common electrical distribution arrangement, the first electrical generator and the second electrical generator being coupled in parallel to the common electrical distribution arrangement, the method comprising:
   regulating electrical voltage upon the common electrical distribution arrangement using the first electrical generator and the voltage controller;
   providing electrical current using the second electrical generator and the current controller;
   providing an actuator signal to the current controller to alter the electrical current provided by the second electrical generator, the actuator signal providing an indication of status of an electrical load upon the common electrical distribution arrangement; and
   adjusting the speed of the second electrical generator to alter the electrical current provided by the second electrical generator.

2. A method as claimed in claim 1 wherein there is more than one second electrical generator.

3. A method as claimed in claim 1 wherein the actuator signal comprises a composite actuator signal from a plurality of electrical loads.

4. A method as claimed in claim 1 wherein the actuator signal is provided by hard wiring or network communication with the current controller.

5. A method as claimed in claim 1 wherein the electrical load provides or receives electrical current from the common electrical distribution arrangement.

6. A method as claimed in claim 1 wherein the electrical load is selected from the group comprising a resistive component and a reactive component.

7. A method as claimed in claim 6 wherein the electrical load is variable.

8. An electrical power system comprising:
   a first electrical generator;
   a voltage controller;
   a second electrical generator;
   a current controller; and
   a common electrical distribution arrangement; wherein
      the first electrical generator and the second electrical generator being coupled in parallel to the common electrical distribution arrangement,
      the first electrical generator being controlled by the voltage controller and being arranged to configure the first electrical generator to regulate voltage upon the common electrical distribution arrangement,
      the second electrical generator being controlled by the current controller and being arranged to provide electrical current to the common electrical distribution arrangement, and
      the system having an electrical load coupled to the common electrical distribution arrangement;
      a control element arranged to provide an actuator signal to the current controller upon change in the status of the electrical load and the current controller being arranged to alter the electrical current provided by the second electrical generator dependent upon the actuator signal; and
      the current controller is arranged to adjust the speed of the second electrical generator to alter the electrical current provided by the second electrical generator.

9. A system as claimed in claim 8 wherein there is more than one second electrical generator.

10. A system as claimed in claim 8 wherein the actuator signal comprises a composite actuator signal from a plurality of electrical loads.

11. A system as claimed in claim 8 wherein the actuator signal is provided by hard wiring or network communication with the current controller.

12. A system as claimed in claim 8 wherein the electrical load provides or receives electrical current from the common electrical distribution arrangement.

13. A system as claimed in claim 8 wherein the electrical load is selected from the group comprising a resistive component and a reactive component.

14. A system as claimed in claim 8 wherein the electrical load is variable.

15. A gas turbine engine incorporating an electrical power system as claimed in claim 8.

16. An aircraft incorporating an electrical power system as claimed in claim 8.

17. A method as claimed in claim 1 wherein the first electrical generator being driven by a first prime mover and the second electrical generator being driven by a second prime mover.

18. A method as claimed in claim 1 further comprising:
   adjusting the speed of the first electrical generator to alter the voltage provided by the first electrical generator.

19. An electrical power system as claimed in claim 8 wherein the first electrical generator being driven by a first prime mover and the second electrical generator being driven by a second prime mover.

20. An electrical power system as claimed in claim 8 wherein the voltage controller is arranged to adjust the speed of the first electrical generator to alter the voltage provided by the first electrical generator.

21. An electrical power system comprising:
   a first electrical generator;
   a voltage controller;
   a second electrical generator;

a current controller; and a common electrical distribution arrangement; wherein the first electrical generator and the second electrical generator being coupled in parallel to the common electrical distribution arrangement, the first electrical generator being controlled by the voltage controller and being arranged to configure the first electrical generator to regulate voltage upon the common electrical distribution arrangement, the second electrical generator being controlled by the current controller and being arranged to provide electrical current to the common electrical distribution arrangement, and the system having an electrical load coupled to the common electrical distribution arrangement;

a control element arranged to provide an actuator signal to the current controller upon change in the status of the electrical load and the current controller being arranged to alter the electrical current provided by the second electrical generator dependent upon the actuator signal; and the first electrical generator being driven by a first prime mover and the second electrical generator being driven by a second prime mover.

* * * * *